United States Patent

Kostelnik et al.

[11] Patent Number: 5,936,863
[45] Date of Patent: Aug. 10, 1999

[54] OPTIMAL SEGMENTATION AND PACKAGING PROCESS

[75] Inventors: Kevin M. Kostelnik; Richard H. Meservey; Mark D. Landon, all of Idaho Falls, Id.

[73] Assignee: Lockheed Martin Idaho Technologies Company, Idaho Falls, Id.

[21] Appl. No.: 09/014,696

[22] Filed: Jan. 28, 1998

[51] Int. Cl.[6] ..................................................... G06F 17/00
[52] U.S. Cl. ................................ 364/474.13; 364/474.26; 364/578; 83/923; 83/930; 376/260
[58] Field of Search ...................... 376/260; 364/468.13, 364/474.13, 474.26, 578; 83/32, 75.5, 923, 930; 29/426.3, 426.4, 426.5

[56] References Cited

U.S. PATENT DOCUMENTS

| | | | |
|---|---|---|---|
| 4,163,321 | 8/1979 | Cunningham | 364/474.13 |
| 4,594,774 | 6/1986 | Barker et al. | 29/723 |
| 4,818,472 | 4/1989 | Operschall et al. | 376/260 |
| 5,158,739 | 10/1992 | Gente et al. | 376/260 |
| 5,297,182 | 3/1994 | Cepkauskas | 376/260 |
| 5,309,959 | 5/1994 | Shaw et al. | 141/130 |
| 5,315,525 | 5/1994 | Bluthgen et al. | 364/474.26 |
| 5,479,969 | 1/1996 | Hardie et al. | 141/130 |
| 5,483,562 | 1/1996 | Kornfeldt et al. | 376/287 |
| 5,523,513 | 6/1996 | Milner | 588/1 |

OTHER PUBLICATIONS

"Decomissioning B204" *British Nuclear Fuel Engineer*, No. 8, Spring 1996, pp. 9–13.

*Primary Examiner*—Daniel D. Wasil
*Attorney, Agent, or Firm*—Thorpe North & Western

[57] ABSTRACT

A process for improving packaging efficiency uses three dimensional, computer simulated models with various optimization algorithms to determine the optimal segmentation process and packaging configurations based on constraints including container limitations. The present invention is applied to a process for decontaminating, decommissioning (D&D), and remediating a nuclear facility involving the segmentation and packaging of contaminated items in waste containers in order to minimize the number of cuts, maximize packaging density, and reduce worker radiation exposure. A three-dimensional, computer simulated, facility model of the contaminated items are created. The contaminated items are differentiated. The optimal location, orientation and sequence of the segmentation and packaging of the contaminated items is determined using the simulated model, the algorithms, and various constraints including container limitations. The cut locations and orientations are transposed to the simulated model. The contaminated items are actually segmented and packaged. The segmentation and packaging may be simulated beforehand. In addition, the contaminated items may be cataloged and recorded.

9 Claims, 2 Drawing Sheets

OPTIMAL SEGMENTATION AND PACKAGING PROCESS

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention relates to a process for improving packaging efficiency using three dimensional, computer simulated models with various optimization algorithms to determine optimal packaging configurations based on constraints including container limitations. More particularly, the present invention relates to a process for decontaminating, decommissioning, and remediating nuclear facilities involving the segmentation and packaging of contaminated items in waste containers in order to minimize the number of cuts, maximize packaging density, and reduce worker radiation exposure by creating a three-dimensional, computer simulated, facility model of the contaminated items and then determining the optimal location, orientation and sequence of the segmentation and packaging of the contaminated items based on various constraints including container limitations.

2. Prior Art

Nuclear reactions are capable of generating enormous amounts of energy. This energy has been used to generate electrical power for many years. Nuclear power plants instigate a nuclear reaction within a nuclear reactor. The nuclear reaction heats a circulating fluid to generate steam for a turbine. The fluid flows through a cycle. In a boiling water reactor, water is converted to steam within the reactor vessel and then supplied to the turbine. In a pressurized water reactor, a fluid is heated within the reactor vessel and then supplied to a heat exchanger to convert water into steam for the turbine. Large fluid handling systems, e including various pipes, vessels, and valves, along with other equipment are required to convert the nuclear energy into electrical power.

During the process of producing energy to heat water, the nuclear reaction also emits potentially harmful radiation. The radiation emitted during the nuclear reaction requires thousands of years to decay. This radiation contaminates the reactor vessel and other components of the nuclear facility including the fluid system. When a nuclear facility nears the end of its useful life, this radiation contamination presents special obstacles to the decontamination, decommissioning (D&D) and remediation process.

One such obstacle is the significant amount of waste that will be generated by the hundreds of facilities currently scheduled for D&D operations. The amount of waste directly effects the cost of dismantling, packaging, shipping, and disposing the contaminated items. Waste containers are expensive and disposal costs are high due to limited disposal space.

Another obstacle is the radiation exposure of workers to the contaminated items. Workers need to wear anti-contamination suits and must time their exposure to keep within acceptable limits.

Currently, the base line for decontamination and decommissioning nuclear facilities involves segmenting the contaminated items, either manually or by remote control, and packaging them manually. This approach is time consuming and inefficient in terms of packing efficiency, and results in high worker exposure rates. Typically, the waste containers are only partially filled. Void space within the waste containers can account for a significant portion of the waste volume. Disposal cost, driven by limited disposal space, is usually based on volume, rather than weight. Therefore, it is important to completely fill the waste containers as much as possible. This can be difficult due to the numerous shapes and sizes of the various contaminated items. In addition, waste containers may be limited as to weight, center of gravity, contamination levels, etc. More importantly, workers are exposed to radiation during the cutting and packaging process. Therefore, the amount of time spent in measuring, segmentation and packaging is critical.

Therefore, it would be advantageous to have a process that efficiently packages a container. In addition, it would be advantageous to have a process for decontaminating, decommissioning, and remediating a nuclear facility to optimize the segmentation and packaging of contaminated items. In addition, it would be advantageous to have a process for simulating the segmentation and packaging of contaminated items to train workers and thus reduce exposure rates during actual segmentation and packaging.

OBJECTS AND SUMMARY OF THE INVENTION

It is an object of the present invention to provide a process for D&D operations that minimizes the number of cuts.

It is another object of the present invention to provide a process for D&D operations that maximizes packaging density.

It is yet another object of the present invention to provide a process for D&D operations that minimizes worker radiation exposure rates.

It is yet another object of the present invention to provide a process for D&D operations that allows for simulation of the segmentation and packaging of the contaminated items.

It is yet another object of the present invention to provide a process for D&D operations that catalogs the segmented items.

It is yet another object of the present invention to provide a process for D&D operations that records the packaging of the contaminated items.

It is yet another object of the present invention to provide an improved packaging system.

It is yet another object of the present invention to provide a process for engineer construction with future disassembly being an additional criteria.

It is yet another object of the present invention to provide a process for cataloging the facility prior to dismantlement.

These and other objects and advantages of the present invention are realized in a process using three dimensional, computer simulated models with various optimization algorithms to determine optimal segmentation procedure and packaging configurations based on constraints, including container limitations. The present invention is applied to a process for decontaminating, decommissioning (D&D), and remediating a nuclear facility. D&D operations involve the segmentation and packaging of contaminated items in waste containers. It is important to minimize the number of cuts and maximize packaging density because of worker radiation exposure and container and disposal costs.

A three-dimensional, computer simulated, facility model of the contaminated items is created. The model includes size, shape, weight, location, orientation, and contamination levels of the contaminated items.

The simulated model may be linked to other modules including databases, geometry models, and optimization algorithms. The modules capture and maintain specific operational information, such as worker exposure records, radiation levels, cost, and scheduling information. Such modules may include a workforce database, an operation database, a hazards database, a facility database, an object database, a training module, a regulatory module, a packaging module, an equipment module, and a segmentation module.

Once the simulated model is created, the various contaminated items to be segmented are defined. In addition, the facility model may be visually displayed. The simulated facility model is preferably viewable from any perspective, including a "walk through" or birds-eye perspective. In addition, the model is preferably capable of being displayed with the radiological levels visible. Furthermore, a copy of the facility model is preferably saved in order to create a historical preservation package. The model may be saved as a paper hard copy or in a video or computer format, such as a video cassette or computer diskette.

The optimal location, orientation and sequence of the segmentation and packaging of the contaminated items is determined. This is done using the simulated facility model, the geometry models, the optimization algorithms, and various constraints. The constraints are input into the algorithms and the models are solved for optimal segmentation and/or packaging. The size of the items may be verified against the model before segmentation to determine alternative packaging or additional cuts.

To find the optimal segmentation, the algorithms determine the location, orientation, and sequence of cuts to minimize cost, worker exposure, and number of cuts based on the constraints. The constraints may include packaging or container constraints, such as size limitations, weight limitations, radiological content limitations, and center of gravity requirements. Other constraints may include limits on radiological exposure and availability.

To find the optimal packaging, the algorithms determine the location and orientation of segments to maximize packaged density minimize worker exposure, and minimize cost based on the constraints. The constraints include limits on container weight, limits on the location of the center of gravity, and limits on radiological content.

The optimal cut location and orientation are transposed to the simulated model. The planned cuts may be visually displayed on the simulated model. In addition, a plan for cutting and disassembling the contaminated items is preferably generated. Furthermore, an illustrative presentation of the operation is preferably created for use with stakeholder and other interested parties. The illustrated presentation will show how the operation will be carried out.

The segmentation may be simulated on the facility model to train the operators. Worker exposure rates can be reduced by training the operators through a simulated segmentation operation prior to actual segmentation. In addition, the packaging of the segmented items may be simulated and animated via computer graphics and video tape recordings.

The contaminated items are then segmented as previously determined. The segmented items are preferably identified. The identification may be a bar code label. Specific information about the segmented item may be recorded, such as its radiological level and disposition. The segmented items may also be cataloged. The size of the objects may be verified against the facility model or the cutting and disassembly plan.

These segmented items are then packaged into waste boxes. The packaged contaminated items are preferably recorded so that a shipping and disposal manifest is created for each waste container.

The present invention may be used for various other packaging operations. For example, the present invention may be used to package other items, such as waste, materials, products, etc., in other containers, such as ships, planes, parcels, etc.

Furthermore, the present invention may be used to plan engineer construction such that disassembly is easier in the future. For example, future nuclear facilities may use the present invention to simulate the D&D process before the facility is even built.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

The process of the present invention involves optimizing the segmentation and packaging of contaminated items of a nuclear facility. The contaminated items include various piping, valves, vessels, and other equipment.

Figure 1:
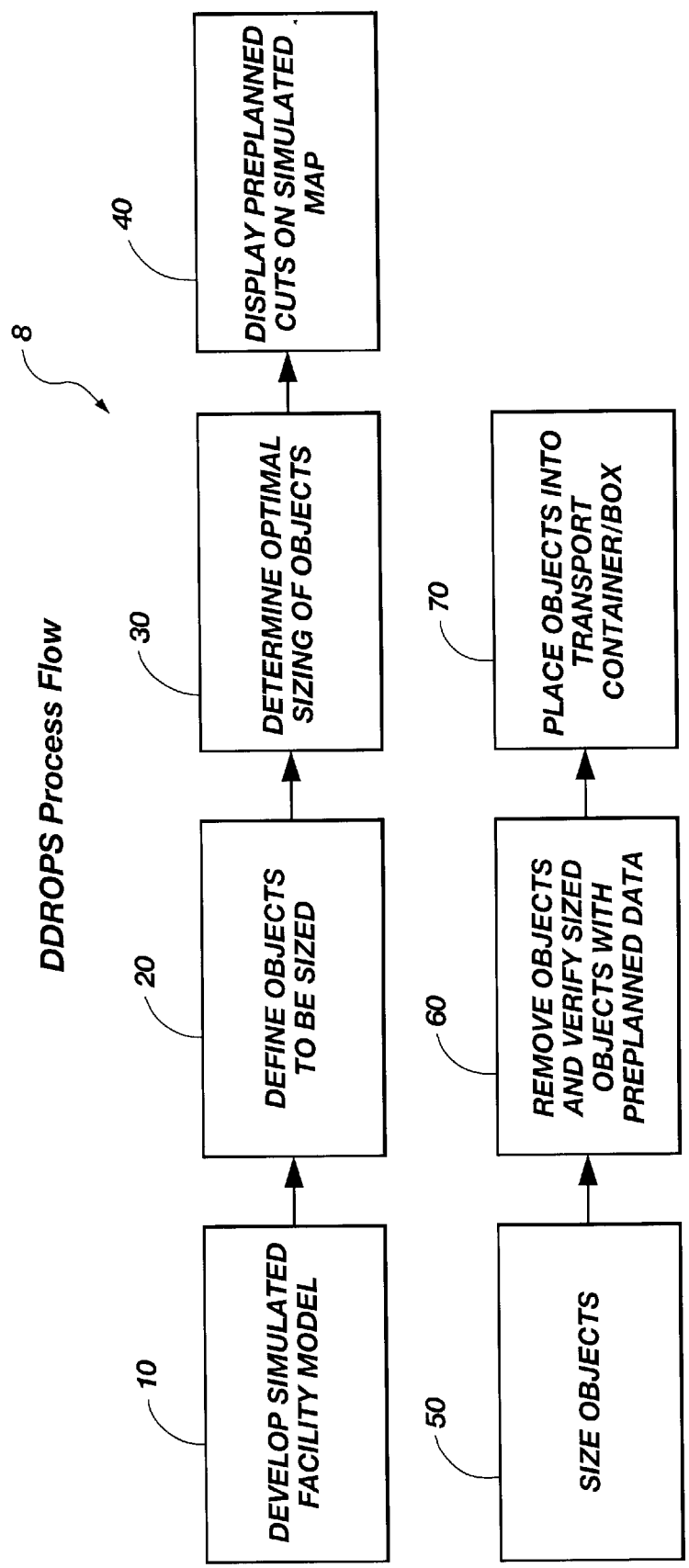
FIG. 1 is a process flow chart of a preferred embodiment of the present invention.

As illustrated in FIG. 1, the process 8 of a preferred embodiment of the present invention is shown. The first step 10 of the present invention is to create a three-dimensional, computer simulated, facility model. The model may be constructed from construction drawings of the facility, engineering drawings of various components, and/or photographic images. The model may include the entire facility, including buildings and structures, but includes at least the contaminated items to be segmented. Drawings or photographs in electronic form may be particularly useful as they may be downloaded directly to the computer without having to manually re-enter them into the computer.

Figure 2:
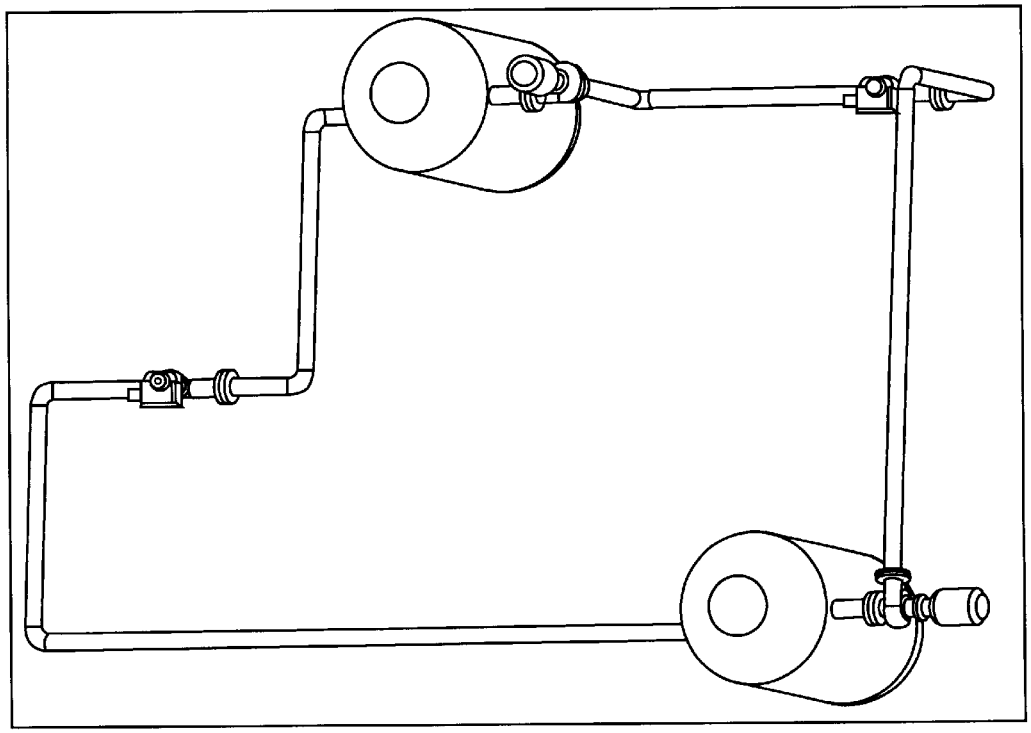
FIG. 2 is a simplified example of a portion of a facility model showing contaminated items to be segmented in accordance with a preferred embodiment of the present invention.

The model is a three-dimensional visual simulation of the facility. In addition, the model contains specific information, including for example, size, shape, weight, location, and interrelationship of the contaminated items. Furthermore, the model preferably includes the radiological contamination levels of the various contaminated items. In the preferred embodiment, the facility model is visually displayed and capable of being viewed from any angle. In addition, the facility model may be displayed from the perspective of an individual walking through the facility. Furthermore, the model is preferably capable of being displayed with the radiological contamination levels visible. Thus, the facility and its character may be visualized through use of the simulated model. This enables presentations to be made without exposing individuals to radiation or dangerous industrial environments. An example of a portion of a facility model is shown in FIG. 2.

A copy of the facility model is preferably saved in order to create a historical preservation package. The model may be saved as a paper hard copy or in a video or computer format, such as a video cassette or computer diskette.

Preferably, the model is linked to other modules including databases, optimization algorithms, and geometry models. These modules capture and maintain specific operational information. A workforce database module may include workforce skills, availabilities, exposure histories, costs, and rates. An operational database module may include disposal estimates, costs, and schedules. A hazards database module may include radiation fields, locations and coordinates, and hazardous waste concentrations and volumes. A training module may include simulations, control station, operator training, and equipment validation. A regulatory module may include regulatory requirements. A packaging module may include inventory schedules, staging controls, loading drivers, and packaging algorithms. An equipment module may contain availabilities, schedules, costs, and a robotics module. A segmentation module may include cutting positions. A facility database module may include three-dimensional images. An object database module may include the sizes, inventory codes, and object relations.

These various modules or databases contain specific information. This information is written in a consistent computer language format such that it is transferable between modules. The facility model may be created using commercially available simulation techniques, including "PRO-E" 3D-CAD database, "RADCAM" and "RAD-SCAN" gamma camera systems, and laser dimensioning.

The second step 20 is to define the various contaminated items to be segmented in the simulated facility model. This may be done manually or automatically by the computer. During this step the computer simulated, facility model is separated into various, discrete object models. Individual objects, such as pipes, tanks, and vessels are identified and cataloged.

The third step 30 is to determine the optimal sizing of the contaminated items. This involves determining the optimal location, orientation and sequence of the cuts to be made of the contaminated items. These determinations are made using the simulated facility model, geometry models, optimization algorithms and various constraints.

The constraints may include packaging constraints such as the size of the waste container and various weight and/or radiological limits. Other packaging constraints may include requirements for the location of the center of gravity for the container and availability of the containers. These constraints, of course, determine the limits on the length, weight, contamination level, center of gravity, and other geometry of the contaminated items.

These constraints may also include scheduling constraints. For example, a specific pipe may not be available for segmentation and packaging because other objects are in the way and must be removed first. Also, a tank may not be available because it is providing structural support for pipes.

These constraints are input into the optimization algorithms. Several optimization algorithms may be used to search for and solve for values of the variables which provide the best objective value while simultaneously satisfying the selected constraints. The applicable algorithms include gradient-based algorithms, simulated annealing, fuzzy logic, genetic algorithms, and neural networks.

The gradient-based algorithms iteratively take derivatives of the objective with respect to the variables and then modify the variables to improve the objective while checking the validity of the constraint function. Another approach uses an annealing algorithm which simulates, or mimics, the process of annealing solids in nature, perturbing the variables randomly until a better objective is realized. This algorithm has the capability to escape local optima by occasionally accepting designs according to a probability function with a worse objective value.

The algorithms used are called optimization algorithms that search for solutions to the following type of problems:
FIND: variables;
TO: minimize or maximize objective;
SUBJECT TO: constraints.
In the case of segmentation optimization, the optimization problem is as follows:
FIND: location, orientation, and sequence of cuts;
TO: minimize cost, worker exposure, and number of cuts;
SUBJECT TO: limitations on size (based on container), limits on weight of segments, limits on radiological exposure.
In the case of packaging optimization, the optimization problem is as follows:
FIND: location and orientation of cuts;
TO: maximize packaged density in container, minimize worker exposure, and minimize total cost;
SUBJECT TO: limits on total container weight, limits on location of center of gravity (mass), limits on total radiological content. The models are then solved for cut location, orientation, and sequence so as to minimize the number of cuts.

By determining the optimal location, orientation and sequence of the cuts to be made, segmentation is made more efficient because the number of cuts is reduced. In addition, packaging densities are increased, thus lowering container and storage costs. Furthermore, worker exposure rates are decreased because less time is spent segmenting.

By determining the optimal packaging, packaging is made more efficient because packing density is increased, thus reducing container and disposal costs. In addition, worker exposure rates are decreased because less time is spent segmenting and packaging.

The fourth step 40 is transposing the optimal location and orientation of the cuts onto the simulated facility model. This maps the location and orientation of the cuts so that operators may make the cuts either manually or by remote control robots. Preferably, a cutting and disassembly plan is generated including the optimized location, orientation, and sequence of cuts.

Figure 3:
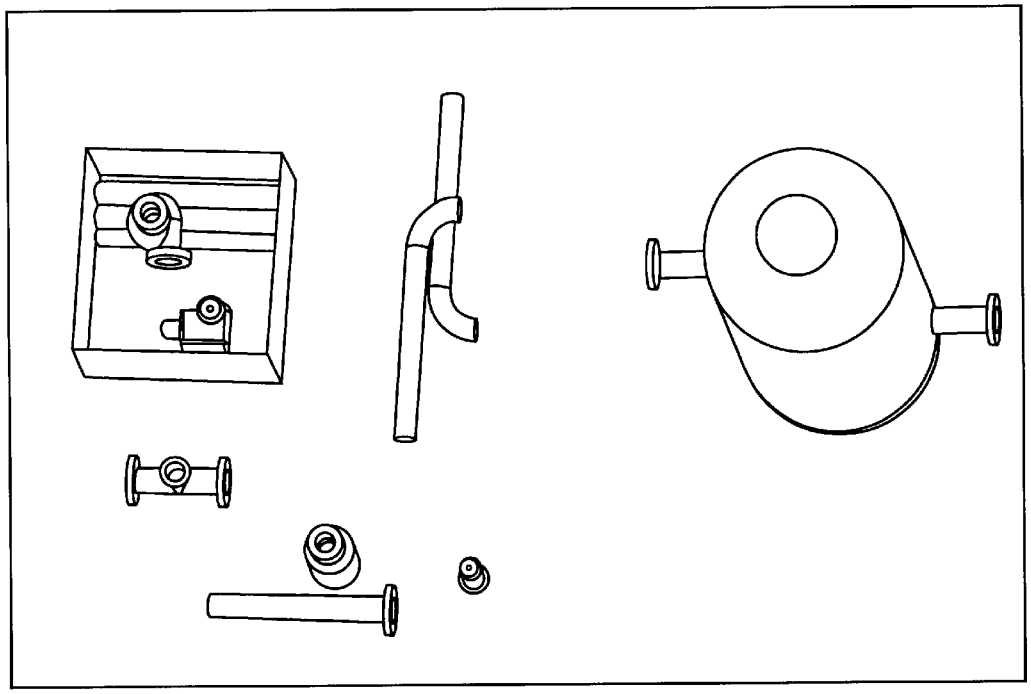
FIG. 3 is a simplified example of a portion of a facility model after the contaminated items have been segmented and packaged in accordance with a preferred embodiment of the present invention.

In the preferred embodiment, the segmentation of the facility model and the packaging of the segmented items may be visually displayed. Thus, an illustrative presentation of the operation may be created for interested stake holders. Again, the simulated facility, segmentation, and packaging allows detailed presentations without exposing individuals to radiation or industrial environments. An example of a segmented portion of a facility model is shown in FIG. 3.

In addition, the operators may simulate the segmentation and packaging on the simulated model prior to actual segmentation. This permits the operators to be trained, thus reducing exposure rates. It also allows for faster segmentation and packaging rates because the operators have simulated the process before.

The fifth step 50 includes actually segmenting the contaminated items as previously determined. The actual segmentation of the contaminated items will be more efficient because the location, orientation and sequence of the cuts have been predetermined, the number of cuts required have been minimized, and the process simulated beforehand.

In the sixth step 60, the size of the segmented items may be verified against the predicted facility model. If the segmented items are within acceptable ranges then the items are packaged. If the segmented items are outside acceptable ranges then the process is redone to determine either a new packaging sequence or secondary segmentation for the unacceptable item.

The final step 70 includes packaging the contaminated items as previously determined. The actual packaging of the contaminated items will be more efficient because the location, orientation, and sequence of packaging the items have been predetermined, the packing density maximized, and the actual packaging simulated beforehand. Worker exposure rates will be reduced because less time will be required to segment and package the contaminated items. Packaging and storing costs will be reduced because fewer containers are required and the containers are more densely packed.

Once the optimal cutting and packaging process have been determined, the individual contaminated items to be segmented may be cataloged. Each individual item can be coded with a bar code sticker. These codes will be placed on the objects prior to positioning them in the waste box. Computerized bar code information will contain such items as facility, location within the facility, subsystem, material, and contamination type and levels. Furthermore, the final step may include recording the contaminated items packaged in each container. This may be used to produce a shipping manifest and disposal records for each waste container.

It is of course understood that the above described process for D&D operation is not limited to nuclear facilities, but may also be used for various other segmenting and packaging operations. For example, the present invention may be used to segment other items, such as waste. The waste may be vehicles, buildings, ships, planes, structures, etc. As another example, the present invention may be used to package other items, such as waste, materials, products, etc., in other containers, such as ships, planes, parcels, etc.

Furthermore, the above described process may be used to plan, design, engineer, and construct such that disassembly may use the present invention to simulate the D&D process before the facility is even built. Such an exercise may be used to modify the design of the facility so that future D&D processes are easier to accomplish. It is of course understood that the process of the present invention may be used for other operations other than nuclear facility D&D operations.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

We claim:

1. A method for minimizing waste, the method comprising the steps of:

(a) creating a three-dimensional, computer simulated model of the waste including size and location of the waste using modules including databases, optimization algorithms, and geometry models; and (b) determining optimal location of cuts to be made of the waste using the simulated model and constraints, which are input into the optimization algorithms, such that the number of cuts are minimized.

2. The method of claim 1, wherein the simulated model created in step (a) further includes shape, weight, orientation and interrelationship of the waste.

3. The method of claim 1, wherein step (b) further comprises generating an optimized cutting plan based on the optimal location of cuts determined.

4. The method of claim 1, further comprising the step of:

(c) segmenting the waste according to the optimal location as previously determined.

5. The method of claim 4, further comprising the step of:

(d) applying an identifying means to each segmented waste for identifying the waste.

6. The method of claim 5, further comprising the step of:

(e) cataloging each segmented waste including identification, size, and final disposition.

7. The method of claim 4, further comprising the step of:

(d) packaging the segmented waste within a container.

8. The method of claim 4, further comprising the step of:

(d) determining optimal location and orientation of segmented waste to be packaged using the simulated model and constraints including container size limits, which are input into the optimization algorithms, such that the number of cuts and the number of containers are minimized and container density is maximized.

9. The method of claim 8, further comprising the step of:

(e) packaging the segmented waste within a container as previously determined.

* * * * *